A. F. Jones. Journal Bearing.

116317

PATENTED JUN 27 1871

Witnesses:
A Bennerendorf,
Gustave Drelensch

Inventor:
A. F. Jones
PER
Mmmmf C
Attorneys.

UNITED STATES PATENT OFFICE.

ALFRED F. JONES, OF NEW YORK, N. Y.

IMPROVEMENT IN JOURNAL-BEARINGS.

Specification forming part of Letters Patent No. 116,317, dated June 27, 1871.

*To all whom it may concern:*

Be it known that I, ALFRED F. JONES, of the city of New York, in the county and State of New York, have invented a new and Improved Journal-Bearing; and I do hereby declare that the following is a full, clear, and exact description thereof, which will enable others skilled in the art to make and use the same, reference being had to the accompanying drawing forming part of this specification.

Figure 1:
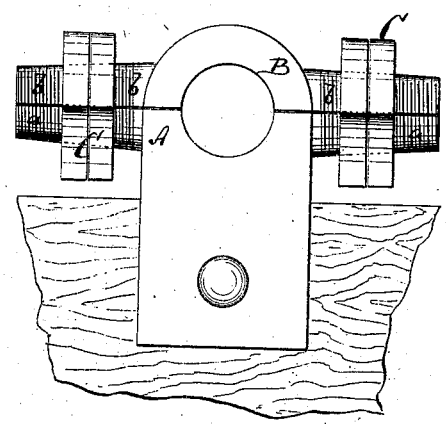
Figure 2:
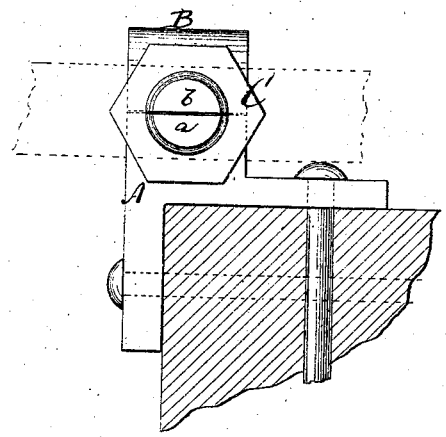
Figure 3:
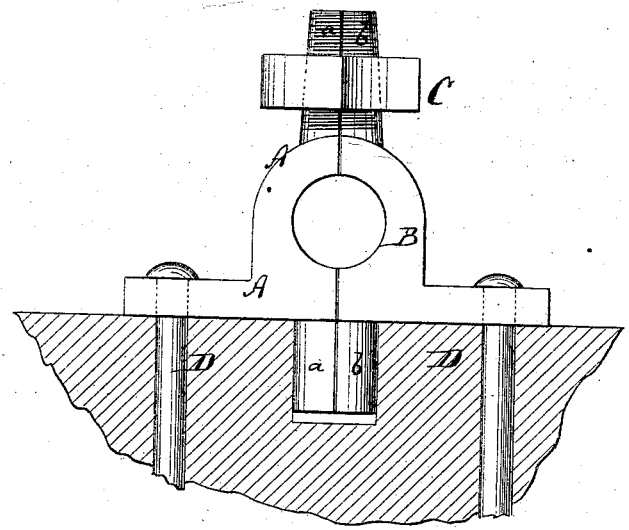

Figure 1 represents a face view of my improved journal-bearing. Fig. 2 is an end view of the same. Fig. 3 is a face view of a modification of the same.

Similar letters of reference indicate corresponding parts.

This invention has for its object to produce a convenient connection for the parts of a journal-bearing; and consists in forming their contiguous ears into conical screws, and applying nuts thereto for holding them together. The screws heretofore used for the same purpose are thus dispensed with, and a connection obtained which can be conveniently regulated by the nuts. The latter, bearing against all sides of the ears with equal pressure, strengthen the bearings considerably, and prevent their working loose.

A B in the drawing are the two parts of a journal-bearing, one being the base and the other the cap, as usually. Their ears or projecting sides $a\ b$ are provided with screw-threads, and so shaped as to constitute conical screws, upon which nuts C are fitted for locking the parts together, as shown.

A modification shown in Fig. 3 represents the parts A B placed vertically, side by side, the lower ears being fitted into a socket of the supporting-frame D, while the upper ears are threaded and receive the nut. The nuts may be doubled or provided with suitable locking devices. If the parts should work loose they may be easily tightened by means of the nuts.

Having thus described my invention, I claim as new and desire to secure by Letters Patent—

The journal-bearings A B, provided with projecting lateral sides $a\ b$, conically shaped, threaded on the outer ends, and locked by nuts C C, when combined with a loosely-revolving shaft, as specified.

ALFRED F. JONES.

Witnesses:
   A. V. BRIESEN,
   T. B. MOSHER.